United States Patent

Love

[15] 3,657,124

[45] Apr. 18, 1972

[54] CALCIUM ALKYLPHENOLATE MANUFACTURE

[72] Inventor: Doris Love, Fishkill, N.Y.
[73] Assignee: Texaco Inc., New York, N.Y.
[22] Filed: Sept. 14, 1970
[21] Appl. No.: 72,120

[52] U.S. Cl. ................................................... 252/42.7
[51] Int. Cl. .................................. C10m 1/20, C01m 1/54
[58] Field of Search .................................... 252/18, 42.7

[56] References Cited

UNITED STATES PATENTS 2,870,134   1/1959   Kluge et al. ..................... 252/42.7 X
3,083,161   3/1963   Kluge et al. ..................... 252/42.7 X Primary Examiner—Daniel E. Wyman
Assistant Examiner—W. Cannon
Attorney—Thomas H. Whaley, Carl G. Reis and Robert A. Kulason

[57] ABSTRACT

Method of preparing a lubricating oil composition of detergent properties containing a calcium salt of alkylphenol comprising introducing into a mixture of an alkoxyalkanol and a member selected from the group consisting of calcium oxide and calcium hydroxide, an oxygen containing gas to form an activated mixture and contacting said activated mixture with an alkylphenol and hydrocarbon oil of lubricating viscosity to form said composition.

10 Claims, No Drawings

CALCIUM ALKYLPHENOLATE MANUFACTURE

BACKGROUND OF INVENTION

This invention relates to a method of preparing a lubricating oil concentrate of calcium alkylphenolate.

The calcium alkylphenolates are useful as additives for lubricating oils in that they promote when used in crankcase lubricants for internal combustion engines, general engine cleanliness, reduced ring sticking, reduced piston skirt varnish formation and reduced corrosiveness. Normally, the contemplated calcium salts are prepared in the form of lube oil concentrates to facilitate their manufacture, handling and incorporation in finished lubricating oil compositions.

Hereinbefore and hereinafter the term "calcium alkylphenolate" is intended to denote essentially normal calcium alkylphenolate which is defined as having a calcium metal ratio of about 1. The calcium metal ratio is defined as the ratio of the number of equivalents of calcium moiety per equivalent of alkylphenol moiety in the calcium alkylphenolate.

In the past, one of the methods employed for preparing the calcium alkylphenolates comprised reacting alkylphenol with calcium oxide or calcium hydroxide in an alkanol medium. Although this past method had the desirable feature of utilizing relatively inexpensive calcium oxide or calcium hydroxide, the prior method had the drawback of being relatively slow, that is, for a given time period the yield rate left much to be desired. In order to overcome this difficulty, other methods were developed in the art such as where calcium carbide was substituted for the calcium oxide or calcium hydroxide. Although the calcium carbide methods overcame to a large measure the deficiencies of the calcium oxide-calcium hydroxide methods as to reaction rate, the calcium carbide methods have the negative aspect of being substantially more costly due to the greater cost of the calcium carbide as opposed to the calcium oxide and calcium hydroxide. Therefore, there was a substantial need for a method which could employ the relatively inexpensive calcium oxide or calcium hydroxide to manufacture the calcium alkylphenolate without the deficiency of low yield rate or at least an improvement therein.

SUMMARY OF INVENTION

I have discovered and this constitutes my invention a method of preparing calcium alkylphenolate utilizing calcium oxide or calcium hydroxide wherein there is a significant improvement of yield rate. More particularly, I have discovered the aforementioned deficiencies can be substantially reduced by introducing into a mixture of calcium oxide or calcium hydroxide and alkoxyalkanol an oxygen containing gas to form an activated mixture and contacting said activated mixture with an alkylphenol and a hydrocarbon lubricating oil.

Hereinbefore and hereinafter "oxygen containing gas" denotes pure oxygen as well as gaseous mixtures normally associated with oxygen, e.g., air and synthetic mixtures such as oxygen and nitrogen mixtures.

DETAILED DESCRIPTION OF THE INVENTION

In detail, one embodiment of the method of the invention comprises introducing an oxygen containing gas into a mixture of (1) hydrocarbon lubricating oil, (2) an alkylated phenol of the general formula:

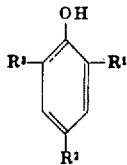

where $R^1$ and $R^3$ are selected from the group consisting of hydrogen and alkyl of one to 30 carbons and $R^2$ is alkyl of from four to 30 carbons, (3) a member selected from the group consisting of calcium oxide or calcium hydroxide and (4) an alkoxyalkanol of the formula:

$R^4OR^5OH$ where $R^4$ is a monovalent saturated aliphatic hydrocarbon radical (alkyl) of one to five carbons and $R^5$ is polymethylene of from two to four carbons.

The reaction is conducted advantageously at a temperature between about 75° and 250° C., desirably at the reflux temperature of the particular alkoxyalkanol employed advantageously utilizing a mole ratio of oxygen to calcium oxide or calcium hydroxide of at least about 1.5:1 and up to about 3:1 and higher, a mole ratio of calcium oxide or calcium hydroxide to alkylated phenol of at least about 0.5:1 and up to 1:1 and higher and a ratio of alkoxyalkanol to calcium oxide or calcium hydroxide of at least about one liter : 1 mole and up to 5 liters : 1 mole and higher. In respect to calcium oxide and hydroxide the employed minimum quantities are most desirably in the interest of ready filtration.

The quantity of lubricating oil employed can be widely varied, e.g., between about 10 and 90 wt. % of the reaction mixture, however, most desirably, it is that quantity which will result in a final lube oil concentrate after removal of the alkoxyalkanol comprising between about 45 and 55 wt. % lubricating oil and between about 55 and 45 wt. % normal calcium alkylphenolate.

The calcium salt containing lube oil concentrate can be isolated from the final reaction mixture by standard means such as removing the free alkoxyalkanol and any volatile byproducts as a distillate, e.g., at temperatures between about 150° and 200° C. in conjunction with reduced pressure if necessary, advantageously employing in conjunction with the distillation a stripping operation involving passage of inert gas such as nitrogen through the final reaction mixture to effect essentially complete removal of the alcohol and volatile products leaving a stripped calcium salt containing lube oil concentrate. Temperature normally in the neighborhood of between about 160° and 180° C. are employed in the stripping operation in conjunction with reduced pressures if necessary. The stripped concentrate can be further purified by filtering e.g., utilizing a filter bed of finely diatomaceous silica to remove the undesired large solid product particles, thereby recovering a purified calcium salt containing lube oil concentrate.

In an alternative embodiment of the method of the invention the oxygen containing gas is introduced into a mixture of calcium oxide or calcium hydroxide and alkoxyalkanol and subsequently introduced in the oxygen activated mixture are the alkylphenol and lubricating oil ingredients. Oxygen gas introduction may be continued, terminated or an inert gas introduction, e.g., with nitrogen may be substituted therefor. In any case, the aforedescribed mole ratios, reaction temperatures and recovery techniques are employed in this embodiment.

One of the important aspects of the invention to accomplish improved yield rate is the introduction of an oxygen containing gas under the conditions defined into a mixture of calcium oxide or calcium hydroxide and alkoxyalkanol. This treatment apparently places the calcium oxide and calcium hydroxide in a more reactive state thereby resulting in an improved yield of calcium alkylphenolate product. Surprisingly, if gases such as nitrogen are substituted for the oxygen containing gas and closely related alkanols substituted for the alkoxyalkanol there is no significant improvement in yield.

Examples of the alkylated phenols contemplated herein are alkylphenols prepared by alkylating phenol with an olefin polymer such as propylene polymer containing nine to 30 carbons. One specific example is a mixture of alkylphenols resulting from the alkylation of phenol with propylene tetramer. This mixture is composed of phenols having $C_{10}$—, $C_{11}$— and $C_{12}$— ($C_{10}$–$C_{12}$) alkyl groups in the para ring position. Further specific examples of suitable alkylated phenols are 4-butylphenol, 4-amylphenol, 4-hexylphenol, 4-octylphenol, 4-hexadecylphenol, 2,4-dibutylphenol, 2,4-dioctylphenol, 2,4-dihexadecylphenol, 2,4-dioctadecylphenol, 2,4,6-tributylphenol, 2,4,6-trioctadecylphenol, 4-eicosylphenol and mixtures thereof.

Examples of the alkoxyalkanols contemplated herein are 2-methoxyethanol, 2-ethoxyethanol, 2-butoxyethanol and 3-methoxypropanol.

Examples of the oxygen containing gas contemplated herein are pure oxygen, air, and oxygen in admixture with inert gas such as nitrogen.

To facilitate the reaction the calcium oxide and calcium hydroxide is desirably employed in a finely divided state, preferably in powdered form.

Examples of the lube oils which may be employed are the mineral lubricating oils, e.g., of refined paraffin and naphthenic base variety of a lubricating viscosity, e.g., having an SUS viscosity at 100° F. of between about 50 and 2,000. Also contemplated are synthetic hydrocarbon lubricating oils of an equal viscosity range such as those of the alkylene polymer variety, specifically, polypropylene and polybutylene.

The normal calcium alkylphenolate product is characterized by the general formula:

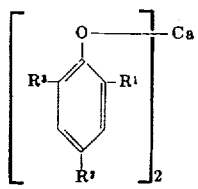

where $R^1$, $R^2$ and $R^3$ are as heretofore defined. Specific examples of the calcium alkylphenolate products contemplated herein are a mixture of calcium 4-decylphenolate, calcium 4-undecylphenolate, and calcium 4-dodecylphenolate. Additional examples are calcium 4-butylphenolate, calcium 4-amylphenolate, calcium 4-hexylphenolate, calcium 4-octylphenolate, calcium 4-hexadecylphenolate calcium 2,4-dibutylphenolate, calcium 2,4-dioctylphenolate, calcium 2,4-dihexadecylphenolate, calcium 2,4-dioctadecylphenolate, calcium 2,4,6-tributylphenolate, calcium 2,4,6-trioctadecylphenolate, calcium 4-eicosylphenolate and mixtures thereof.

The following examples further illustrate the method of the invention but are not to be construed as limitations thereof.

EXAMPLE I

This example illustrates a first embodiment of the method of the invention.

To a 2 liter flask, fitted with a stirrer, reflux condenser and thermocouple for temperature control, there were charged 277 grams of a 4-$C_{10}$–$C_{12}$ alkylphenol, 297 grams of a naphthenic mineral lubricating oil of an SUS viscosity of about 100 at 100° F., 28 grams calcium oxide and 500 mls. of 2-methoxyethanol. Stirring was initiated and the stirred mixture was airblown at a rate of 100 mls. per minute at reflux (about 124° C.) for a period of 3 hours. At the end of the reaction period the reaction mixture was stripped with nitrogen for an additional period of 3 hours and filtered through a cake of diatomaceous silica. The filtrate was analyzed and found to be a lube oil concentrate solution of normal calcium alkylphenolate characterized by the formula:

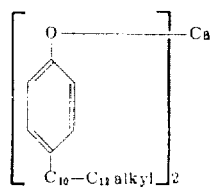

Specific analysis of the lube oil concentrate filtrate found the following:

| ANALYSIS | VALUE |
|---|---|
| Actual wt. % calcium | 3.0 |
| Theoretical wt. % calcium | 3.38 |
| Concentrate yield, wt. % | 82 |

EXAMPLE II

This example illustrates a second embodiment of the method of the invention.

To a 2 liter flask, fitted with a stirrer, reflux condenser, gas inlet and outlet tube and thermocouple for temperature control, there were introduced 500 mls. of methoxyethanol, and 28 grams of calcium oxide. The resultant mixture was air-blown at reflux (125° C.) at a rate of 100 mls. per minute for a period of 3 hours. At the end of the 3 hour period, 277 grams of 4-$C_{10}$–$C_{12}$ alkylphenol and 297 grams of naphthenic mineral oil of an SUS viscosity of about 100 at 100° F. were added and the resultant mixture and solvent were stripped with nitrogen to 210° C. and then continued to be stirred at 210° C. under nitrogen for 3 hours and filtered through a cake of diatomaceous silica. The filtrate was analyzed and found to be the lube oil concentrate solution of normal calcium $C_{10}$–$C_{12}$ alkylphenolate characterized by the formula in Example I. Analysis of the lube oil concentrate found the following:

| ANALYSIS | VALUE |
|---|---|
| Actual wt. % calcium | 3.1 |
| Theoretical wt. % calcium | 3.38 |
| Concentrate yield, wt. % | 88 |

EXAMPLE III

The procedure of Example I was repeated with the exception that oxygen was substituted for air. Analysis of the normal calcium $C_{10}$–$C_{12}$ alkylphenolate lube oil concentrate product gave the following:

| ANALYSIS | VALUE |
|---|---|
| Actual wt. calcium | 3.0 |
| Theoretical wt. % calcium | 3.8 |
| Concentrate yield, wt. % | 85 |

EXAMPLE IV

This example illustrates the method of the invention as expressed by the first embodiment using calcium hydroxide as the calcium reagent.

The procedure of Example I was employed with the exceptions 37 grams of calcium hydroxide was substituted for the calcium oxide and 750 mls. of 2-methoxyethanol was utilized. The final product was identified as lube oil concentrate of normal calcium 4-$C_{10}$–$C_{12}$ alkylphenolate of the following analysis.

| ANALYSIS | VALUE |
|---|---|
| Actual wt. % calcium | 2.2 |
| Theoretical wt. % calcium | 3.38 |
| Concentrate yield, wt. % | 69 |

EXAMPLE V

This example illustrates the materiality of the employment of oxygen in the method of the invention for the converion of the alkylphenol to the calcium alkylphenolate in an improved yield.

The procedure of Example II was repeated in 3 runs with the exception in Run A oxygen was substituted for air, in Run B nitrogen was substituted for the air and in Run C carbon dioxide was substituted for the air. In all three runs the lube oil concentrate filtrate was analyzed for calcium $C_{10}$–$C_{12}$ alkylphenolate content and said content is reported below in terms of percent calcium.

| Run No. | Gas | Wt. % Calcium In Concentrate (Theory 3.38) |
|---|---|---|
| A | $O_2$ | 3.1 |
| B | $N_2$ | 1.8 |
| C | $CO_2$ | 0.2 |

EXAMPLE VI

This example illustrates the importance of employing an alkoxyalkanol as defined.

Eight runs were made as follows:

In Run D the procedure of Example I was employed except 500 mls. of methyl alcohol were substituted for methoxyethanol and the air blowing rate was 500 mls./minute.

In Run E the procedure of Example I was repeated with the exception that 500 mls. of methyl alcohol were subsituted for methoxyethanol and the mixture was blown with oxygen at a rate of 500 mls. per minute.

In Run F the procedure of Example I was employed with the exception that toluene was substituted for methoxyethanol.

In Run G the procedure of Example II was repeated with the exception that toluene was substituted for methoxyethanol.

In Run H the procedure of Example I was repeated with the exception that butyl alcohol was substituted for methoxyethanol and oxygen was substituted for air.

In Run I the procedure of Example II was repeated with the exception that butyl alcohol was substituted for methoxyethanol.

In Run J in an apparatus as described in Example I 31 grams of calcium oxide and 500 mls. of distilled water were combined and refluxed with air at a rate of 500 mls. per minute for a period of 6 hours. Subsequently, 277 grams of 4-$C_{10}$-$C_{12}$ alkylphenol and 297 grams of naphthenic mineral oil of an SUS viscosity of about 100 at 100° F. were added, the solvent was stripped with nitrogen to 177° C. and stirring was thereafter continued for a 3 hour period followed by filtration of the resultant reaction mixture through diatomaceous silica.

In Run K utilizing the apparatus as described in Example II there was charged to the reactor 31 grams of calcium oxide and 750 mls. of water. The combined mixture was refluxed with air blowing at 250 mls. per minute for a period of 6 hours. Subsequently, 277 grams of $C_{10}$-$C_{12}$ alkylphenol and 297 grams of naphthenic mineral oil of an SUS viscosity of about 100 at 100° F. were charged and the resultant mixture was stripped and stirring was continued at 210° C. for a 3 our period whereupon it was filtered through diatomaceous silica.

The yield of normal calcium $C_{10}$-$C_{12}$ alkylphenolate in the lube oil concentrate reported in terms of percent calcium are set forth in the following table:

| Run No. | Solvent | Wt. % Ca (Theory: 3.38) |
| --- | --- | --- |
| D | Methanol | 0 |
| E | Methanol | 0 |
| F | Toluene | 0.02 |
| G | Toluene | 0.01 |
| H | Butanol | 0.1 |
| I | Butanol | 0.02 |
| J | Water | 0.18 |
| K | Water | 0.10 |
| Ex. I | 2-methoxyethanol | 3.00 |
| Ex. II | 2-methoxyethanol | 3.10 |

EXAMPLE VII

This example further illustrates the method of the invention and demonstrates the first and second embodiments of the invention are equivalent.

In Runs L and M below the procedure of Examples I and II were employed respectively except 750 mls. of 2-methoxyethanol were utilized.

In Runs N and O below the procedure of Examples I and II were repeated with the exception that 31 grams of calcium oxide were employed rather than 28 grams in Runs L and M.

The test data and results are reported below:

| Run No. | Example Procedure | % Cal. (Theory 3.38) |
| --- | --- | --- |
| L | I | 2.4 |
| M | II | 2.3 |
| N | I | 2.3 |
| O | II | 2.3 |

I claim:

1. A method of preparing a lubricating oil composition containing a normal calcium alkylphenolate comprising introducing into a mixture of a member selected from the group consisting of calcium oxide and calcium hydroxide and an alkoxyalkanol of the formula:

$$R^4OR^5OH$$

where $R^4$ is alkyl of one to five carbons and $R^5$ is polymethylene of two to four carbons, an oxygen containing gas at a temperature between 75° and 250° C. in a mole ratio of oxygen to said member of at least about 1.5:1 to form an activated mixture and contacting said activated mixture with a lubricating oil and alkylphenol of the formula:

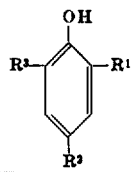

where $R^1$ and $R^2$ are selected from the group selected from the group consisting of hydrogen and alkyl of from one to 30 carbons and $R^3$ is alkyl of four to 30 carbons utilizing a mole ratio of said member to said alkylphenol of at least about 0.5:1 and a ratio of alkoxyalkanol to said member of at least about a liter/mole, said lubricating oil being present in an amount between about 10 and 90 wt. % in said contacting, separating said alkoxyalkanol from the final reaction mixture and filtering the alkoxyalkanol-free final reaction mixture to recover said composition as filtrate.

2. A method in accordance with claim 1 wherein said oxygen containing gas is introduced into a mixture of said member, said alkoxyalkanol, said alkylphenol and said hydrocarbon lubricating oil.

3. A method in accordance with claim 1 wherein said oxygen containing gas is introduced into a mixture consisting of said member and said alkoxyalkanol.

4. A method in accordance with claim 2 wherein said alkoxyalkanol is 2-methoxyethanol, $R^1$ and $R^3$ are hydrogen, $R^2$ is $C_{10}$-$C_{12}$ alkyl.

5. A method in accordance with claim 3 wherein said alkoxyalkanol is 2-methoxyethanol, $R^1$ and $R^3$ are hydrogen, $R^2$ is $C_{10}$-$C_{12}$ alkyl.

6. A method in accordance with claim 4 wherein said oxygen containing gas is air and said member is calcium oxide.

7. A method in accordance with claim 5 wherein said oxygen containing gas is are and said member is clacium oxide.

8. A method in accordance with claim 4 wherein said oxygen containing gas is oxygen.

9. A method in accordance with claim 5 wherein said oxygen containing gas is oxygen and said member is calcium oxide.

10. A method in accordance with claim 4 wherein said oxygen containing gas is air and said member is calcium hydroxide.

* * * * *